H. P. Kreiner,
Stop Cock.

No. 86,020.      Patented Jan. 19, 1869.

Witnesses;
Wm A Morgan
G. C. Colton

Inventor;
H P Kreiner
per Munn & Co
Attorneys

United States Patent Office.

H. P. KREINER, OF BERLIN, PRUSSIA, ASSIGNOR TO P. F. KREINER, OF NEW YORK CITY.

Letters Patent No. 86,020, dated January 19, 1869.

IMPROVEMENT IN STOP-COCKS.

The Schedule referred to in these Letters Patent and making part of the same.

*To all whom it may concern:*

Be it known that I, H. P. KREINER, of Berlin, in Prussia, have invented a new and useful Improvement in Stop-Cocks; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
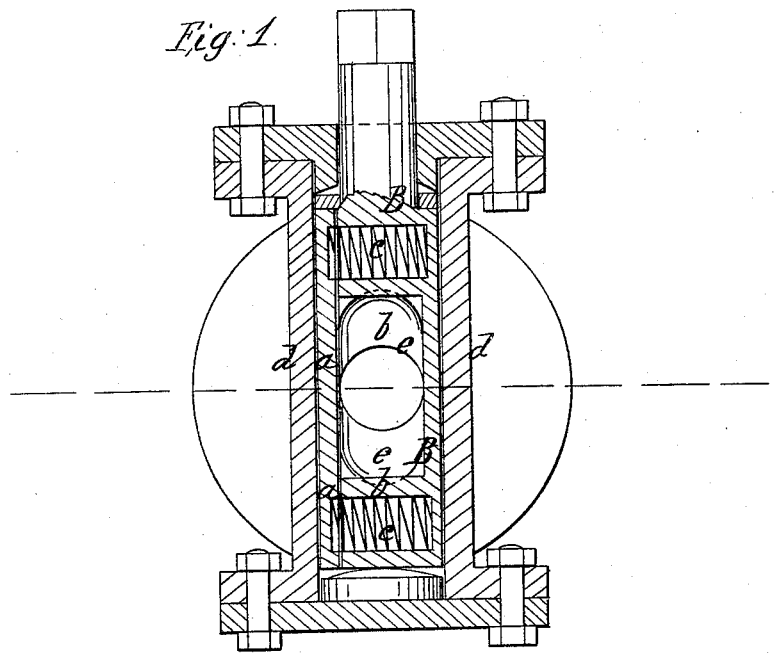
Figure 1 represents a vertical section of my improved stop-cock, taken on the plane of the line $x\,x$, fig. 2.

This invention relates to a new manner of making the spigot or stopper of a faucet or tap fit tight in its seat.

It consists in making such spigot or stopper of two or more longitudinal pieces or sections, which are pressed against the sides of the enclosing pipe, by means of springs interposed between them.

By this invention the spigot will always be perfectly tight, even when it is somewhat worn, and will not be liable to get out of order.

A, in the drawing, represents a portion of a pipe or faucet, in which the transverse receptacle or case for the spigot B is arranged, in ordinary or suitable manner.

This spigot is composed of two longitudinal pieces, $a$ and $b$, between which springs $c\,c$ are interposed, so as to press them tightly against the inner sides of the surrounding tubular casing $d$.

The aperture $e$ through the spigot is cut parallel with the division-line of the two sections.

Figure 2:
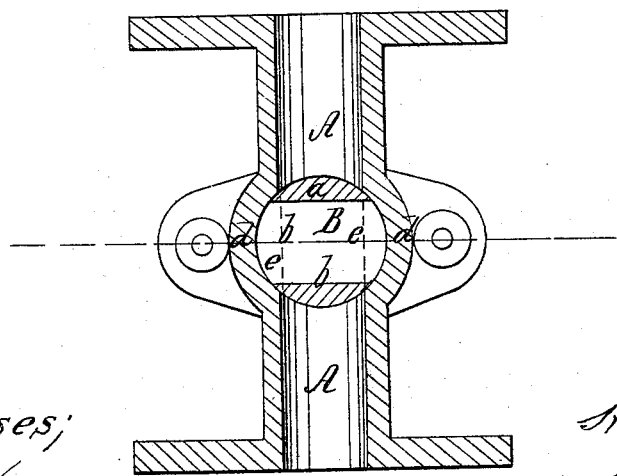
Figure 2 is a horizontal section of the same, taken on the plane of the line $y\,y$, fig. 1.

When the spigot is turned to bring its aperture in line with the pipe A, the fluid can pass freely through the pipe; while, when the spigot is turned with its aperture at right angles to the direction of the pipe A, the two sections of the spigot will close the two parts of the pipe A, and will, by the spring $c$, be caused to close them effectually, as indicated in fig. 2. The line of division between the two sections $a\,b$ will then be out of the way of the pipe A, and no fluid can consequently leak through the stop, when the same is closed.

When the spigot gets worn, it will, by the springs, be nevertheless held tight against the surrounding case.

Instead of splitting the spigot once, it may consist of three or more longitudinal sections, if desired.

The shape of the spigot and its seat may be cylindrical or conical.

Having thus described my invention,

I claim as new, and desire to secure by Letters Patent—

The spigot of a stop-cock, constructed of two or more longitudinal sections, with springs interposed between said sections, above and below the water-way, substantially as and for the purposes herein shown and described.

The above specification of my invention signed by me, this 9th day of June, 1868.

Berlin.

H. P. KREINER.

Witnesses:
W. DÖRFFURT,
H. KREISMANN.